Patented Dec. 11, 1934

1,984,174

UNITED STATES PATENT OFFICE 1,984,174

MERCURATED HYDROXY ARYL SULPHIDES

Walter G. Christiansen, Glen Ridge, N. J., and Eugene Moness, Brooklyn, N. Y., assignors to E. R. Squibb & Sons, New York, N. Y., a corporation of New York No Drawing. Application June 2, 1933, Serial No. 674,050

10 Claims. (Cl. 260—13)

This invention relates to, and has for its object the provision of, mercurated hydroxy aryl sulphides, especially mercurated hydroxy diphenyl sulphides. These compounds may be prepared by treating hydroxy aryl sulphides with mercuric acetate in suitable solvents. When, as for ordinary use, these compounds are dissolved in aqueous alkaline solutions, the acetoxy group joined to the mercury atom is replaced by a hydroxy group, and the hydrogen of the hydroxy group joined to the nucleus is replaced by an alkali metal.

As an example, monoacetoxymercury 4-hydroxy diphenyl sulphide may be prepared by dissolving 3 g. of 4-hydroxy diphenyl sulphide in 60 cc. of alcohol, and slowly adding, while stirring and heating, a solution of 4.5 g. of mercuric acetate in 21 cc. of water acidified with 0.3 cc. of acetic acid; the mixture is heated on the steambath and mechanically agitated, for about half an hour or until it gives a negative ammonium-sulphide test for mercury; the slight brown residue is filtered off and washed with hot alcohol; the alcoholic filtrate and washings are alkalinized with dilute alkali, the slight blackish residue is filtered off, and the clear filtrate carefully neutralized with dilute acetic acid; and the precipitate is filtered off, washed with water, and dried in vacuo, yielding the desired compound as a white powder soluble in hot acidified (acetic acid) alcohol and in dilute aqueous sodium hydroxide containing an excess of alkali, solution in the latter causing conversion of the

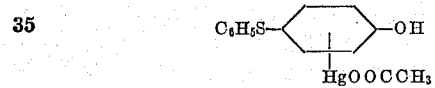

into

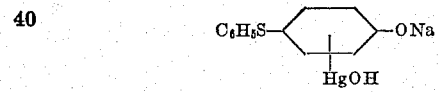

By doubling the proportion of mercuric acetate in the foregoing example, there is obtained the diacetoxymercury compound, a white powder soluble in dilute aqueous sodium hydroxide containing an excess of alkali. This alkaline solution must be protected from access of carbon dioxide, which would bring about precipitation.

By substituting for the 4-hydroxy diphenyl sulphide and the mercuric acetate in the foregoing example 3.2 g. of 2-methyl 4-hydroxy diphenyl sulphide and 4.79 g. of mercuric acetate, respectively, monoacetoxymercury 2-methyl 4-hydroxy diphenyl sulphide, a white powder, is obtained.

To prepare diacetoxymercury 4,4'-dihydroxy diphenyl sulphide, presumably having the formula

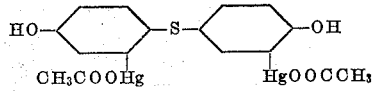

5 g. of 4,4'-dihydroxy diphenyl sulphide may be dissolved in 70 cc. of alcohol; a solution of 14.6 g. of mercuric acetate in 80 cc. of water containing 0.8 cc. of glacial acetic acid is added; the mixture is heated and stirred on a steam bath for half an hour; the thick yellow precipitate is collected by filtration, washed with water, and dissolved in dilute aqueous alkali; and after filtration, precipitation is effected by means of dilute acetic acid, and the desired compound is obtained as a brownish powder.

These mercurated hydroxy aryl sulphides exhibit marked bactericidal properties. Thus, monoacetoxymercury 4-hydroxy diphenyl sulphide destroys *Bacillus typhosus* in 15 and 5 minutes in 1:60,000 and 1:7,500 dilutions, respectively, and *Staphylococcus aureus* in 10, 5, and 1 minutes in 1:30,000, 1:6,000, and 1:3,000 dilutions, respectively.

It is to be understood that the foregoing examples are merely illustrative and by no means limitative of the invention, which may be variously otherwise embodied—as with respect to specific mercurated hydroxy aryl sulphides and the processes of preparing and using them—within the scope of the appended claims.

We claim:
1. Mercurated hydroxy aryl sulphides.
2. Mercurated hydroxy diphenyl sulphides.
3. Monoacetoxymercury 4-hydroxy diphenyl sulphide.
4. Diacetoxymercury 4-hydroxy diphenyl sulphide.
5. Diacetoxymercury 4,4'-dihydroxy diphenyl sulphide.
6. Alkali-metal salts of mercurated hydroxy aryl sulphides.
7. Alkali-metal salts of mercurated hydroxy diphenyl sulphides.
8. Alkali-metal salts of monoacetoxymercury 4-hydroxy diphenyl sulphide.
9. Alkali-metal salts of diacetoxymercury 4-hydroxy diphenyl sulphide.
10. Alkali-metal salts of diacetoxymercury 4,4'-dihydroxy diphenyl sulphide.

WALTER G. CHRISTIANSEN.
EUGENE MONESS.